Patented Nov. 13, 1934

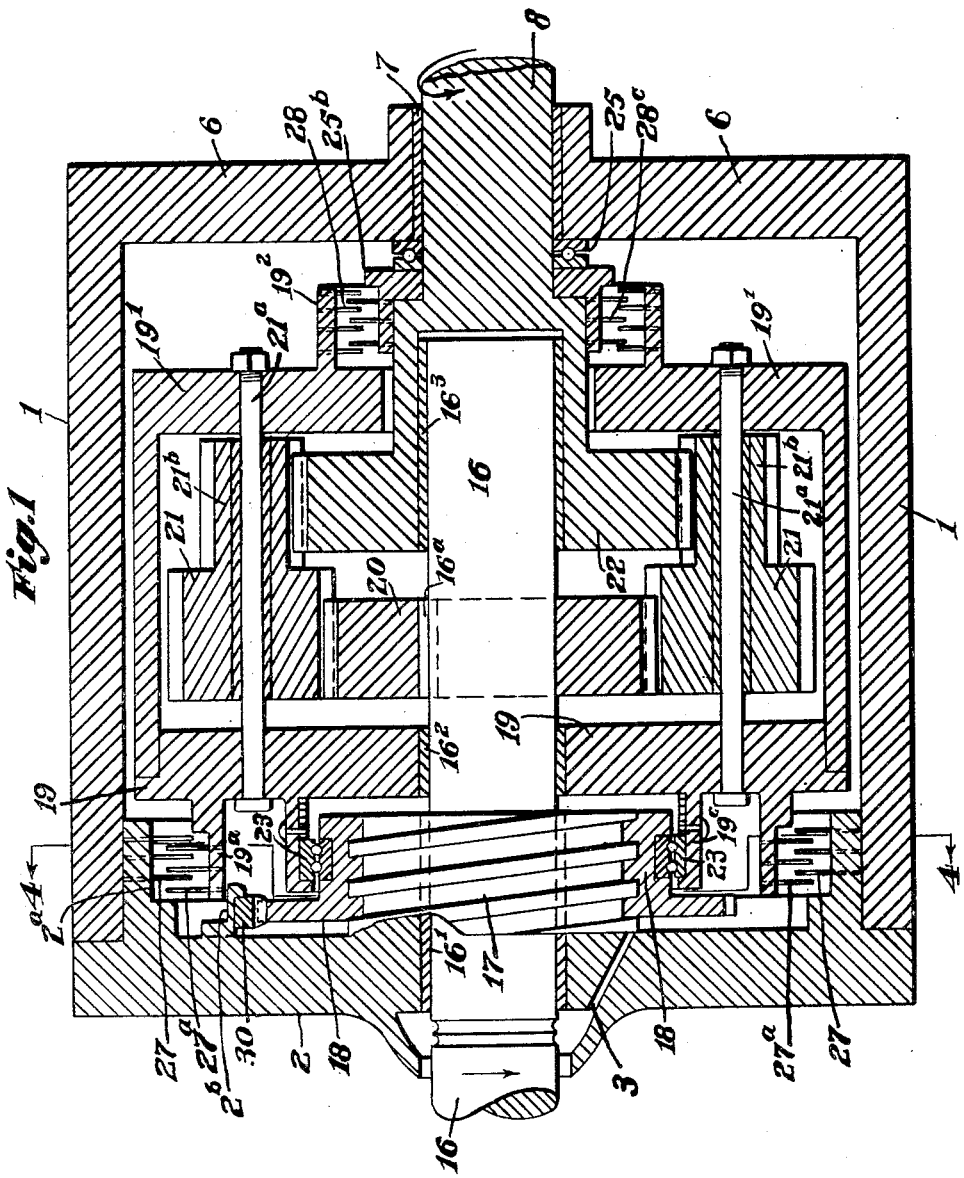

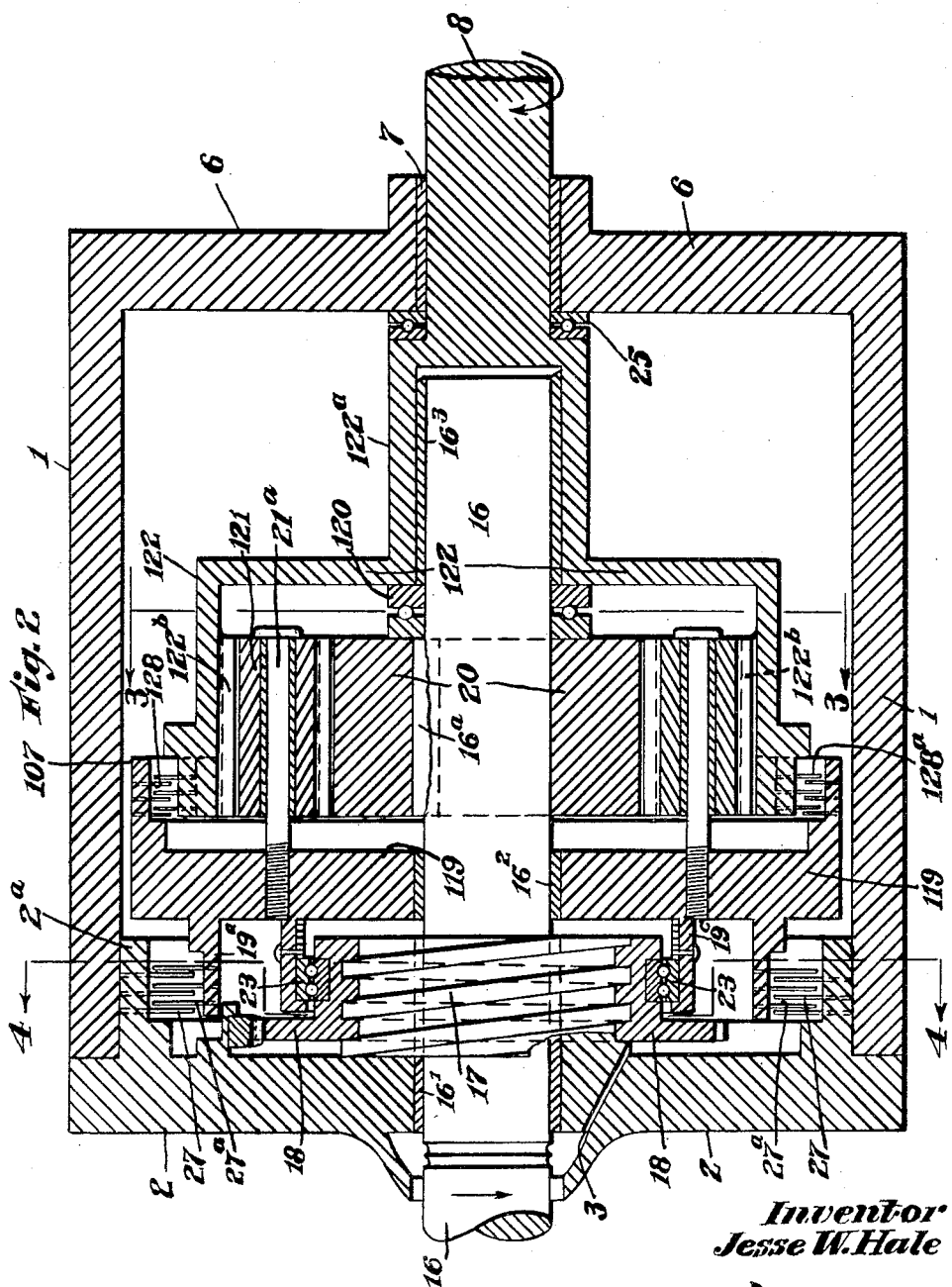

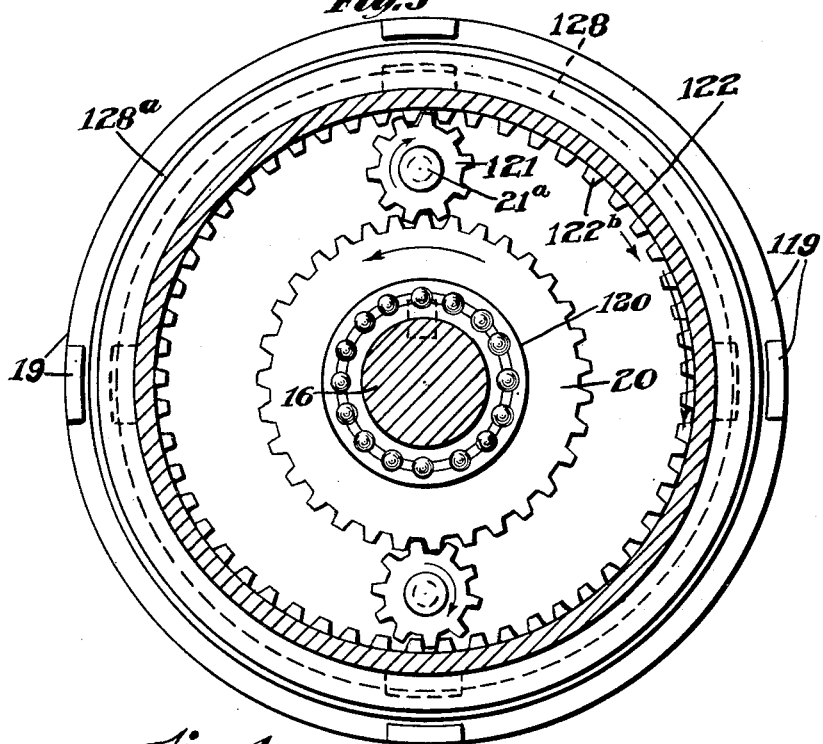
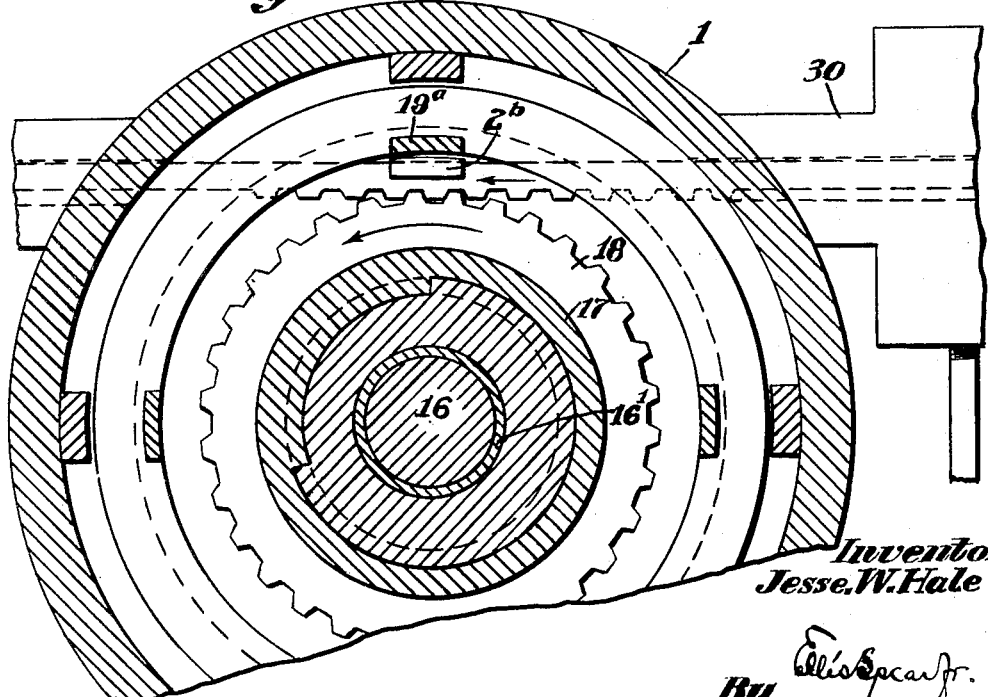

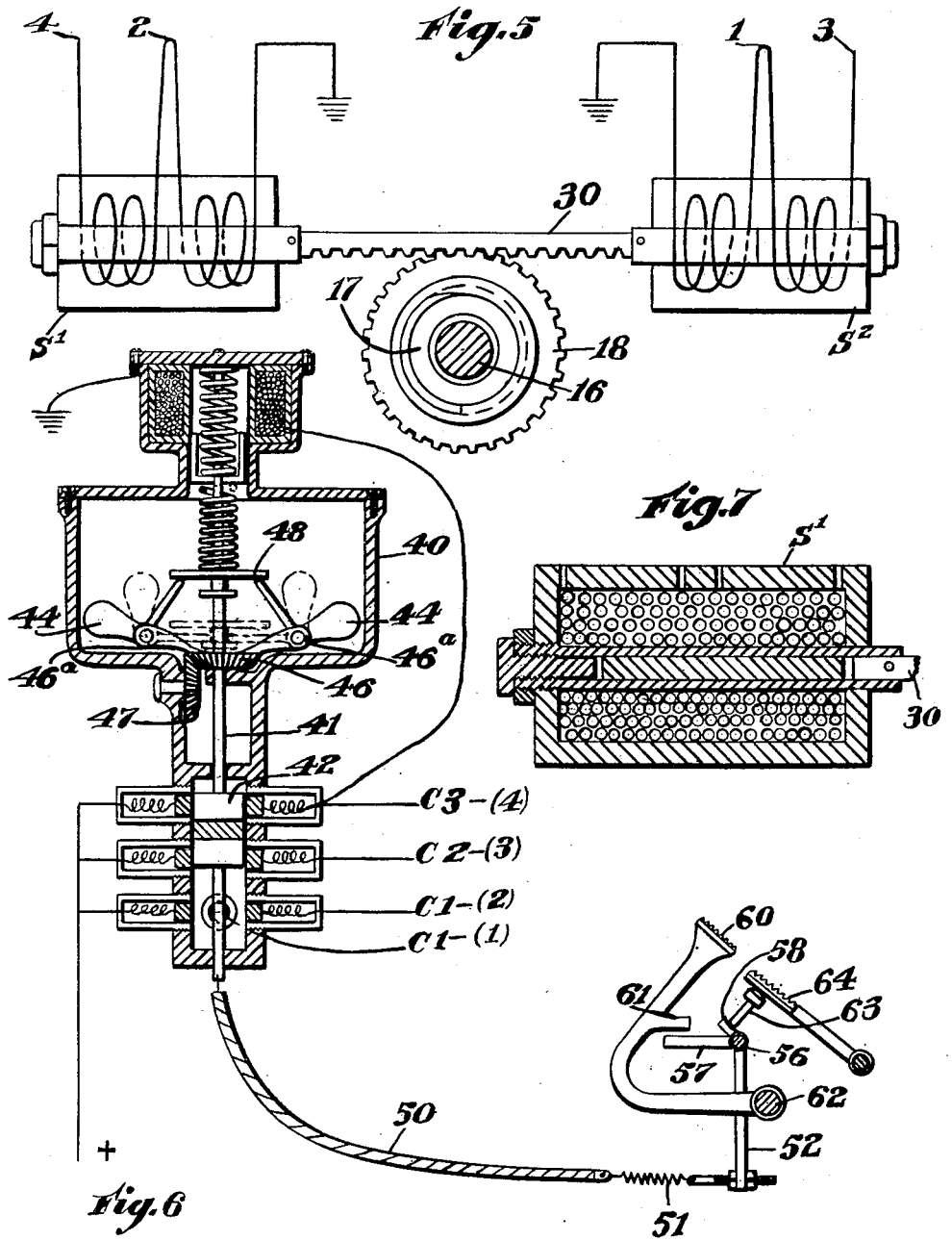

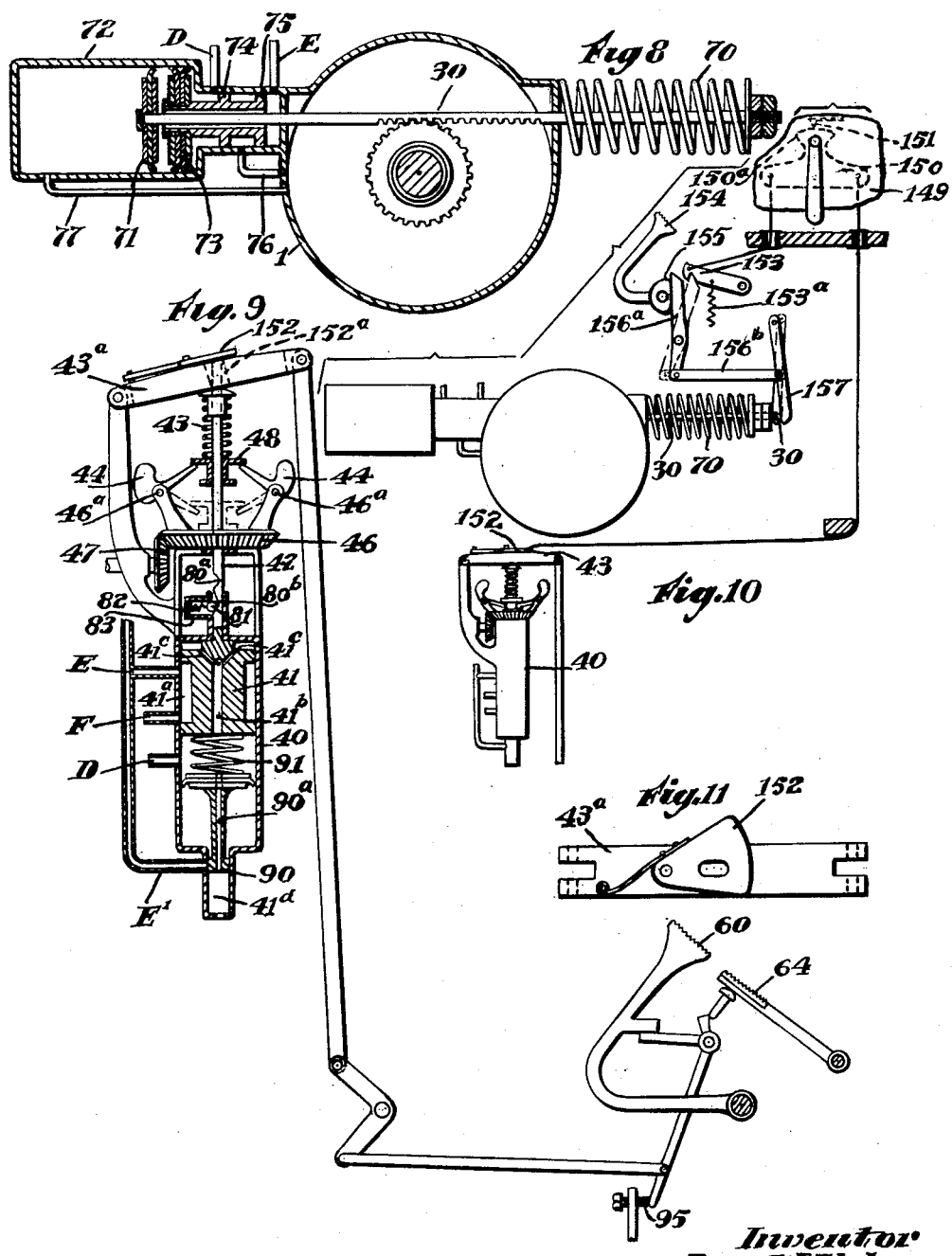

1,980,798

UNITED STATES PATENT OFFICE 1,980,798

CHANGE SPEED SYSTEM

Jesse W. Hale, Newton Center, Mass.

Application August 7, 1933, Serial No. 683,918

15 Claims. (Cl. 74—260)

My present invention relates to improvements in change speed systems and more particularly to those in which the speed is automatically controlled. In such mechanisms there has been long sought means for effecting a desired or predetermined progression in gear ratio by which a driving shaft or like source of power is made to operate a driven shaft or like member. The many efforts made in the automobile industry in recent years indicate the importance of the problems involved.

My invention is adapted to any type of power generator or transmission on which the load is to be picked up and absorbed gradually, as for example in machinery of rolling mill type, printing presses, railways, automobiles or other apparatus which normally must be started under loads and in which the speed is desired to be increased after the original inertia has been overcome.

For the purposes of the discussion of my invention, I cite as a characteristic use that in combination with a motor of internal combustion type. With such motors the initial start is readily effected when not under load but when subject to an initial or suddenly increasing resistance the motor is likely to be stalled before the apparatus has acquired sufficient momentum to keep up its own operation. In such devices it is important that the structures be simple and yet be efficient in use and readily capable of upkeep and repair.

Systems in accordance with my invention provide for ready starting and for acceleration under control by hand or foot with automatic governors operating selectively at predetermined speeds to change gear ratios as required.

For the purposes of illustration, I have shown in the accompanying drawings embodiments well adapted to those previously suggested requirements and in themselves simple and efficient.

Throughout the specification and drawings like reference characters are employed to indicate corresponding parts. In the drawings:

Fig. 1 is a longitudinal section through a characteristic unit in accordance with my invention.

Fig. 2 is a similar view of a modification providing for a reversal in the drive.

Fig. 3 is a section on the line 3—3 of Fig. 2.

Fig. 4 is a fragmentary section on the line 4—4 of Fig. 2.

Fig. 5 is a schematic view of the change speed control.

Fig. 6 is a partly sectioned view of the governor control and foot control connection.

Fig. 7 is a sectional view of a solenoid for operating the control indicated in Fig. 5.

Fig. 8 is a partly sectional view of a modified form of change speed control.

Fig. 9 is a view similar to Fig. 6 as adapted to the form of control shown in Fig. 8.

Fig. 10 is a partly sectional view of a mechanism to keep the gears in neutral position, and Fig. 11 is a vertical view of the governor lock shown in Fig. 10.

In the embodiment shown, 1 is the casing for my change speed unit having a front plate 2 and a rear end 6. At 3, I provide a return for any leakage from the interior. The unit is centrally apertured to receive the drive shaft 16 and the driven shaft 8. The drive shaft and the casing 2 are provided with suitable bearings $16^1$ to permit shaft rotation. A gear 20 is splined or keyed on to the shaft 16 as at $16a$.

Inside the casing 1 is a gear casing or member consisting of the end plate 19 and the member $19^1$. At the only point of contact with the shaft 16 I provide bearings $16^2$ so that the gear casing is slidable in either direction. Suitably positioned within the gear box by the bolt or shaft $21a$ is the gear 21 made integrally with the gear $21b$ in mesh with the gear 20 and the gear $21b$ in mesh with the gear 22 which is separated from the shaft 16 by bearings $16^3$. The gear 22 is shown as made integrally with the shaft 8.

The end plate 2 has an annular flange $2a$ on which are mounted the clutch plates 27. It is also provided with a shoulder $2b$ carrying the rack or toothed member 30 which controls the gear 18.

On the plate 19 of the gear box there is an annular flange $19a$ for the clutch plate $27a$ and an annular flange $19c$ which with the gear 18 provides a suitable recess for ball bearings 23.

On the opposite end of the gear box there is an annular shoulder $19^2$ for the clutch plate 28 which is designed to engage the clutch plate $28c$ on the ring $25b$ on the shaft 8. The ring $25b$ and the end plate 6 are separated by ball bearings 25.

In Fig. 2 I have shown an embodiment of my invention adapted to reverse direction of movement of my driven shaft 8. This is similar to the form shown in Fig. 1, the difference being that member 122 (22 in Fig. 1) is formed with internal teeth $122b$ to overlie the gear 121 driven by the gear 20, and is separated from the shaft 16 in its axial portion $122a$ by the bearings $16^3$ and the ball bearings 120. The flange 107 of the member 119 supports clutch plate 128 adapted to be engaged with clutch plate $128a$ on the gear 122.

In Fig. 5 I show the gear 18 and the rack 30 and two solenoids S1 and S2 influencing the rack 30 in a manner to be later described. I may, of course, use other means of moving the rack 30.

In Fig. 6 I have suggested a control indicating its use in connection with an automobile.

In Fig. 6 I have indicated a governor casing 40 in which is mounted a shaft 41 carrying in its lower portion a circuit closing piston 42. The piston 42 is adjusted by a gear 46 in mesh with the gear 47 suitably rotated by some driven part of the motor. The gear 46 carries a support 46a to which are pivotally secured the weighted arms 44. The arms 44 are in contact with the collar 48 on the shaft 42 which is depressed by the spring 43. The weighted arms 44 are thrown outward by centrifugal force as the rotation of the gear 46 is increased. The arms 44 are formed so that as the arms are thrown outward the collar will be raised and the piston 42 will move to close the desired circuit to the solenoids S1 and S2 indicated in Figs. 5 and 6 to produce a circuit 1 to both solenoids adjusting the rack in neutral position, in circuit 2 a low speed, and in circuit 3 a direct drive.

A connection 50 is made to the shaft 41 so that the governor may be influenced by the brake control 60 or the accelerator 64.

The connection 50 is connected by a spring 51 to the lever 52 which, beyond the fulcrum 56, has two arms 57 and 58. The arm 57 is adapted to contact the arm 61 on the brake 60 so that depressing the brake pedal 60 will tend to influence the piston 41, by increasing spring tension, so that the lower speed circuit or the idling circuit will be successively closed at a higher rate of speed.

The accelerator pedal 64 contacts a rod 63 influencing the arm 58 on the lever 52 which retards the upward motion of the shaft 41 as the engine speed increases by increasing spring tension.

The desired circuits are thus closed and the solenoids carry the rack 30 to a predetermined position and the gear 18 is turned in relation to the screw 17.

When the rack is held in idling position the clutches 27 and 27a and 28 and 28a are not engaged. Therefore, the gear 20 engages the gear 21, and, since the gear 22 is not to be driven, the gear box itself rotates freely, and the gear 21b merely runs around the gear 22.

When the low speed circuit is closed the gear box is carried forward by the screw action and the clutch plates 27 and 27a engage, holding the gear box against rotation. It is then obvious that the shaft 8 will be driven at low speed by the gear 20 turning the gears 21 and 21b which now will turn the gear 22.

When the direct drive circuit is closed, the gear box is carried rearwardly by the screw action of the rack 30 on the gear 18, and the clutch plates 28 and 28c are engaged. As before, the gear 20 will rotate the gears 21 and 21b but as the gear box is now engaged with the collar 25b, the entire gear box will rotate imparting direct drive to the shaft 8.

I have also provided modified means for positioning the rack, in which the moving force is derived from fluid under pressure.

In Fig. 8, the rack 30 is held in low speed position by a spring 70 and at its opposite position has a piston head 71 confined in a casing 72. Inside of the piston 71 is a second piston 73 which is slidable independently of the rack 30, and which is formed with two annular rings 74 and 75. In the position shown in Fig. 8, neither of the pistons 71 or 73 is moved. A fluid inlet D enters between the piston 73 and the ring 74 and fluid entering at that point moves the piston 73 against the piston 71 to carry it into neutral position. The ring 74 closes the inlet D, and further movement of the piston 73 will permit the fluid to pass through the outlet 76 into the casing 1, thereby limiting the movement of the piston 73 to hold the rack 30 in neutral position.

The fluid inlet E is provided to influence the piston 71 independently of the piston 73 so that the piston 71 may move the rack 30 to a position, which, as previously described, will produce high speed.

In control of these means is a governor somewhat similar to the one previously described in connection with the electrical control.

The governor casing 40 has within it a piston 41 carried by the rod 42 carrying a collar 48 depressed by a spring 43. The collar 48 is adapted to be carried upwardly by the weighted arms 44 which are pivotally secured to supports 46a on the gear 46 which through the gear 47 is influenced by engine speed. The piston 41 is longitudinally bored as at 41b and vented by radial openings 41c to permit fluid which may have escaped above the piston 41 to pass through the relief 41d.

Through the casing 40 there is a fluid inlet F. When the piston 41 is in its lowest position, fluid will pass through the inlet F, through the annular recess 41a through the outlet D to adjust the gears to neutral position. As engine speed increases, the piston 41 will be carried upwardly so that no fluid will pass through the outlet D which will be connected to relief chamber.

Above the cylinder portion of the casing 40, the shaft is formed with notches 80a and 80b adapted to receive the member 81 under tension of the spring 82 in its casing 83. This has the effect of retarding the movement of the shaft 42 at points when ports are in operative position, and as the apex of the adjacent slopes of the notches 80a and 80b is reached, the movement of the rod 42 is accelerated so that the governor does not remain in inoperative position.

When the governor is in position to open the outlet D or outlet E to relief, the spring 70 holds the rack 30 in a position to produce low speed.

After the engine speed has increased sufficiently to carry the rod 42 upwardly so that notch 80b is in contact with the detent 81, the piston 41 is in a position that permits the fluid to flow through the outlet E.

As the engine speed is greater in low speed than it would be to produce the same vehicle speed in direct drive, and accordingly permit the piston 41 to drop from high speed position, I provide means to offset this. I provide in the lower portion of the casing 40 a piston 90 hollowed as at 90a to permit drainage to the relief 41d, which is connected to return side of pressure source. The piston 90 carries a spring 91 bearing against the base of the member 41. The lower portion of the member 90 has portions adapted to close a port $E^1$ on the pipe line E when the member 90 is at its highest position, and at other times permitting fluid to force the piston upward so that the action of the spring 91 will permit slower rotation of the weighted arms to hold the piston 41 in position to permit the continual circuit through the pipe line E.

The foot accelerator 64 and brake 60, through levers pivotally mounted, are adapted to move the lever 43a to depress the spring 43, the rod 42 not being influenced by this action. This compression of the spring 43 tends to increase its tension thereby retarding the upward movement of the rod 42. I provide at 95 a stop to prevent a movement of the levers against the accelerator 64.

I have provided suitable controls for my device which may be most readily understood by describing a typical operation. A control 150 is provided on the control board 149 having a spring detent 151 adapted to hold the control 150 in the catches 150a when the control 150 is rotated to engage the detent 151. One side of the control is connected to the governor and operates a spring controlled cover 152 to seal the entrance 152a through the lever 43a for the rod 42. So confined, the piston 41 is unable to rise permitting warming up or like operation of the engine without gear engagement. When the control 150 is in this position, a catch 153 is released. In operation, the clutch pedal is first depressed and the member 150 moved to disengaged position. The catch 153 is then drawn down by the spring 153a and the clutch is held disengaged. The clutch 154 includes a cam 155 which on depression of the clutch through the levers 156a and 156b draws the lever 157 against the rack 30 compressing the spring 70 and the rack 30 is moved to neutral position.

Reverse movement of the member 150 releases the clutch pedal 153 and uncovers the rod 42 giving automatic control over the change speed device self adjusting to engine speed and operating conditions.

It is to be understood that the embodiment shown as descriptive thereof is not to be in any way a limitation of my invention as obviously a motor or other suitable means may be used to move the gear casing into desired position.

What I therefore claim and desire to secure by Letters Patent is:—

1. In a change speed device, a casing, a driving member axially entrant thereof, a main driving gear on said driving member, a driven shaft, a differential gear connection between said driving and said driven shaft, said differential gear connection comprising an independently mounted slidable gear box with differential gears mounted therein, clutch plates to hold said gear box to said casing, and clutch plates to hold said gear box in contact with said driven shaft, a member on said casing, a carrier adapted to travel over said member, a connection between said carrier and said box permitting free rotation thereof, and means responsive to engine speed to move said carrier in either direction on said member.

2. In a change speed device, a casing, a driving member axially entrant thereof, a main driving gear on said driving member, a driven shaft, a differential gear connection between said driving and said driven shaft, said differential gear connection comprising a rotatable and slidable gear box with differential gears mounted therein, clutch plates to hold said gear box to said casing, clutch plates to hold said gear box in contact with said driven shaft, and means controlled by fluid pressure for moving said gear box to predetermined positions to engage said clutch plates.

3. In a change speed device, a casing, a driving member axially entrant thereof, a main driving gear on said driving member, a driven shaft, a differential gear connection between said driving and said driven shaft, said differential gear connection comprising a rotatable and slidable gear box with differential gears mounted therein, clutch plates to hold said gear box to said casing, clutch plates to hold said gear box in contact with said driven shaft a gear box carrier, a member in control of said carrier, and electrically controlled means in control of said member whereby desired positioning of the gear box is effected.

4. In a change speed device, a casing, a driving member axially entrant thereof, a main driving gear on said driving member, a driven shaft, a differential gear connection between said driving and said driven shaft, said differential gear connection comprising an independent movable gear box with differential gears mounted therein, clutch plates to hold said gear box to said casing, and clutch plates to hold said gear box in contact with said driven shaft, a screw, a movable gear engageable with said screw to move said gear box in either direction to engage said clutch plates alternatively, a toothed member in mesh with said gear, and means actuating said toothed member.

5. In a change speed device, a casing, a driving member axially entrant thereof, a main driving gear on said driving member, a driven shaft, a differential gear connection between said driving and said driven shaft, said differential gear connection comprising an independent movable gear box with differential gears mounted therein, clutch plates to hold said gear box to said casing, and clutch plates to hold said gear box in contact with said driven shaft, a screw, a movable gear engageable with said screw to move said gear box, a rack engageable with said movable gear, and means causing said rack to move said gear in either direction on said screw whereby said gear box alternatively engages said clutch plates.

6. In a change speed device, a casing, a driving member axially entrant thereof, a main driving gear on said driving member, a driven shaft, a differential gear connection between said driving and said driven shaft, said differential gear connection comprising an independent movable gear box with differential gears mounted therein, clutch plates to hold said gear box to said casing, and clutch plates to hold said gear box in contact with said driven shaft, a screw, a movable gear engageable with said screw to move said gear box, a toothed member engageable with said movable gear, and electrical means for causing said toothed member to move said gear in either direction on said screw whereby said gear box alternately engages said clutch plates.

7. In a change speed device, a casing, a driving member axially entrant thereof, a main driving gear on said driving member, a driven shaft, a differential gear connection between said driving and said driven shaft, said differential gear connection comprising an independent movable gear box with differential gears mounted therein, clutch plates to hold said gear box in contact with said driven shaft, a screw, a movable gear engageable with said screw to move said gear casing, a rack engageable with said movable gear, and electrical means for causing said rack to move said movable gear in either direction on said screw including a governor and means actuating said governor.

8. In a change speed device, a casing, a driving member axially entrant thereof, a main driving gear on said driving member, a driven shaft, a differential gear connection between said driving and said driven shaft, said differential gear connection comprising an independently mounted slidable gear box with differential gears mounted therein, clutch plates to hold said gear box to said casing, and clutch plates to hold said gear box in contact with said driven shaft, a screw, a gear adapted to be carried by said screw, said screw engageable with said gear box, a toothed member meshed with said screw carried gear, and electrical means for moving said toothed member to move said gear in either direction on said screw, whereby said slidable gear box is positioned to permit selected clutch engagement.

9. In a change speed device, a casing, a driving member axially entrant thereof, a main driving gear on said driving member, a driven shaft, a differential gear connection between said driving and said driven shaft, said differential gear connection comprising an independently mounted slidable gear box with differential gears mounted therein, clutch plates to hold said gear box to said casing, and clutch plates to hold said gear box in contact with said driven shaft, a screw, a gear adapted to be carried by said screw, said screw engageable with said gear box, a toothed member engaged with said gear box, and electrical means including solenoids for moving said rack to move said gear in either direction on said screw, whereby said slidable gear box is positioned to permit selective clutch engagement, and a governor influencing said solenoids.

10. In a change speed device, a casing, a driving member axially entrant thereof, a main driving gear on said driving member, a driven shaft, a differential gear connection between said driving and said driven shaft, said differential gear connection comprising an independently mounted slidable gear box with differential gears mounted therein, clutch plates to hold said gear box to said casing, clutch plates to hold said gear box in contact with said driven shaft, a screw, a gear adapted to be carried by said screw, said screw engageable with said gear box, a toothed member engaged with said gear box, a spring in control of said rack, a cylinder, means in said cylinder in control of said rack, governor controlled means for introducing fluid under pressure to said means to move said rack to produce predetermined gear ratios.

11. In a change speed device, a casing, a driving member axially entrant thereof, a main driving gear on said driving member, a driven shaft, a differential gear connection between said driving and said driven shaft, said differential gear connection comprising an independently mounted slidable gear box with differential gears mounted therein, clutch plates to hold said gear box to said casing, and clutch plates to hold said gear box in contact with said driven shaft, a screw, a gear adapted to be carried by said screw, said screw engageable with said gear box, a toothed member engaged with said gear box, a spring in control of said rack, a cylinder, means in said cylinder in control of said rack, said means comprising a pair of concentric pistons, one of said pistons being connected to said rack, the other of said pistons influencing said rack by contact with said first named piston, movement limiting means for said piston, said first named piston being movable beyond said second named piston, fluid inlets to each piston, a fluid pressure system, and a governor in control of said system directing the flow of fluid subject to engine speed and operating conditions.

12. In a change speed device, a driving shaft and a driven shaft, a fixed casing, a differential gear connection between said shafts, a rotatable and slidable housing for said gears within said casing, clutches adapted to hold said housing to said casing and said driven shaft successively, a carrier to control the longitudinal position of said housing, a member in control of said carrier, and fluid pressure controlled means responsive to the speed of the driven shaft to position said member to effect desired clutch engagements.

13. In a change speed device, a driving shaft and a driven shaft, a fixed casing, a differential gear connection between said shafts, a rotatable and slidable housing for said gears within said casing, clutches adapted to hold said housing to said casing and said driven shaft successively, a carrier to control the longitudinal position of said housing, a member in control of said carrier, fluid pressure controlled means responsive to the speed of the driven shaft to position said member to effect desired clutch engagements, and said means including a centrifugally controlled valve and throttle and brake control to retard the operation of said valve.

14. In a change speed device, a driving shaft and a driven shaft, a fixed casing, a differential gear connection between said shafts, a rotatable and slidable housing for said gears within said casing, clutches adapted to hold said housing to said casing and said driven shaft successively, a carrier to control the longitudinal position of said housing, a member in control of said carrier, and electrically controlled means responsive to the speed of the driven shaft to position said member to effect desired clutch engagements.

15. In a change speed device, a driving shaft and a driven shaft, a fixed casing, a differential gear connection between said shafts, a rotatable and slidable housing for said gears within said casing, clutches adapted to hold said housing to said casing and said driven shaft successively, a carrier to control the longitudinal position of said housing, a member in control of said carrier, electrically controlled means responsive to the speed of the driven shaft to position said member to effect desired clutch engagements, said means including a centrifugally controlled circuit closer and brake and throttle controls to retard the action of said circuit closer.

JESSE W. HALE.